Dec. 11, 1956     C. ANZI ET AL     2,773,497
METHOD AND APPARATUS FOR MEASURING CONSUMPTION OF OXYGEN
Filed March 8, 1954
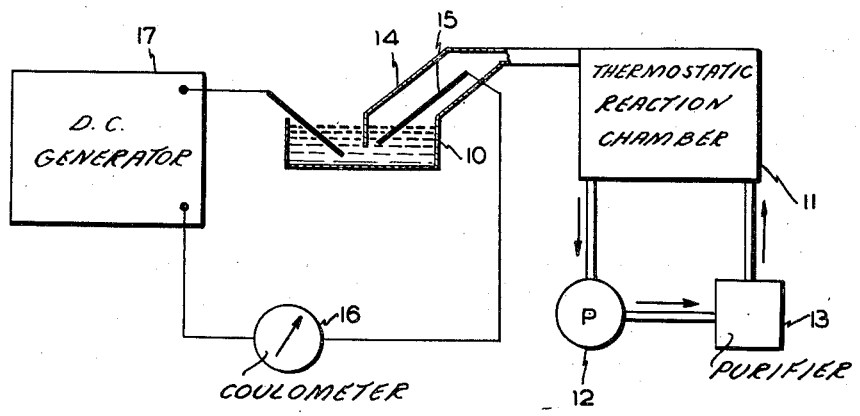
INVENTORS
COSTANTINO ANZI &
VITTORIO CAPRARO
BY Harold T. Stowell
ATTORNEYS United States Patent Office 2,773,497
Patented Dec. 11, 1956

2,773,497

METHOD AND APPARATUS FOR MEASURING CONSUMPTION OF OXYGEN

Costantino Anzi and Vittorio Capraro, Milan, Italy, assignors to Carlo Erba, S. P. A., Milan, Italy, a firm Application March 8, 1954, Serial No. 414,816

Claims priority, application Italy March 10, 1953

2 Claims. (Cl. 128—2.07)

It is known that the measurement of basal metabolism and the measurement of $O_2$ consumed in an oxidation, chemical or biological process, is, in medical and biological practice, currently performed by means of instruments called metabolimeters, in which a pneumatic bell, charged with a known quantity of $O_2$, is utilized as a reservoir-supplier of $O_2$, and the measurement of the quantity of $O_2$ consumed by the subject under examination is obtained by calculating at 0° of temperature, and at 760 mm. Hg of pressure and dryness, the volume of $O_2$ which the pneumatic bell has supplied to the subject under examination.

The employment of the pneumatic bell necessitates calculation in order to ascertain the quantity of $O_2$ consumed in grammolecules. The purpose of the present invention is not only to obviate such calculations, but to make possible performing measurements of unlimited duration, with an accuracy of measurement considerably greater than that which is normally attainable with the current methods.

The principles of the invention are illustrated in the accompanying drawing which is a diagrammatic representation of apparatus embodying the invention and suitable for practising the method of the invention.

The apparatus comprises an electrolytic cell 10, capable of developing $O_2$, connected by means of a tube to the thermostatic chamber 11 in which the oxidation process takes place (e. g., respiration). The chamber is equipped with a mechanical system for the circulation and purification of air, consisting of the pump 12 and the purifier 13. The entire volume comprising the chamber 11, the pump 12, the purifier 13, the bell 14 placed around the electrode 15 and the connecting tubes, is hermetically sealed to the outside. An electrical instrument 16 (amperesecondimeter, amperemeter, or coulombometer) affords time measurement and integration of the quantity of electricity supplied by the direct-current generator 17 to the electrolytic cell 10.

The functioning of the system is as follows:

The electrode 15 immersed in the electrolyte releases $O_2$ in quantities directly proportional to the quantity of electricity passing through it (Faraday's law), exactly one gram-atom of $O_2$ every $2 \times 96.540$ Coulombs (electro-chemical equivalent), independently of temperature and pressure. The electric current passing through the electrolytic cell depends both on the voltage applied to it and on the total electrical resistance of the circuit (Ohm's law). Assuming the voltage supplied by the generator 17 to be constant, and the resistances in ohms of the conductors, the instrument, the internal resistance of the generator itself and the resistance of the electrolyte all to be of fixed value, we can regard the strength of the circulating current as depending solely on the resistance of contact between the electrode 15 and the electrolyte, or, in the last analysis, depending on the submerged surface of the electrolyte itself.

Should the $O_2$ released by electrode 15 not be consumed in chamber 11, it will tend to produce an overload in the hermetically sealed environment in which it develops. Such overload will cause a lowering in the level of the electrolyte in cell 10 and, consequently, a reduction in the submerged surface of electrode 15, with a relative reduction in the amount of $O_2$ produced. Should the $O_2$ not be consumed in 11, there would in the long run be such a reduction in the level of the electrolyte as to nullify the submerged surface of electrode 15, and therefore stop the production of $O_2$.

An analogous and opposite effect of autoregulation will ensue if the consumption of $O_2$ in 11 exceeds the amount of $O_2$ released; the consequent depression leads to an increase in the level of the electrolyte with a relative increase in the production of $O_2$.

It is evident from the above that the rapidity and sensitivity of the autoregulation system can be varied by regulating the inclination of the electrode in respect of the surface of the electrolyte, its shape and nature, the total volume of the environment in which the gas is released and consumed, etc.

It is clear that the autoregulation system described above enables the pressure (and therefore the content of $O_2$) to be maintained constant in the apparatus, for a consumption of $O_2$ equal to or lower than the maximum $O_2$ releasing capacity of electrode 15.

From the above it will appear that it is possible to read on the instrument 16 the quantity of $O_2$ consumed in an oxidation process of unlimited duration, independently of temperature and pressure; it is also possible to calibrate 16 in litres of $O_2$ or in calories.

It is to be borne in mind that since the quantity of $O_2$ released by electrolysis is dependent solely on the product—current $\times$ time (ampere-seconds), variations in voltage at the generator 17 will not lead to error in measurement.

Moreover, the apparatus as described above has the considerable advantage of not requiring the supply of $O_2$ from other sources. It will be apparent that numerous variations and modifications of the apparatus shown and described by way of example may be applied without departing from the principles of the invention.

We claim:

1. Apparatus for the determination of oxygen consumed by an oxidation variable process in biological substrates comprising an electrolytic dissociation cell, a collection chamber around the oxygen-producing electrode of said cell immersed in the cell electrolyte to seal said collection chamber, a constant temperature chamber in which said oxidation process occurs, a conduit connecting said collection chamber with said constant temperature chamber, and means for measuring the quantity of electricity consumed by said cell.

2. Apparatus as defined in claim 1 in which said electricity measuring means is calibrated in terms of calories.

References Cited in the file of this patent

UNITED STATES PATENTS

| 1,401,035 | Boisen | Dec. 20, 1921 |
| 2,430,895 | Tuve et al. | Nov. 18, 1947 |

OTHER REFERENCES

"Principles of Electroplating and Electroforming," by Blum et al., third edition (1949), page 259. (Copy in Sci. Lib.).